Figure 2:
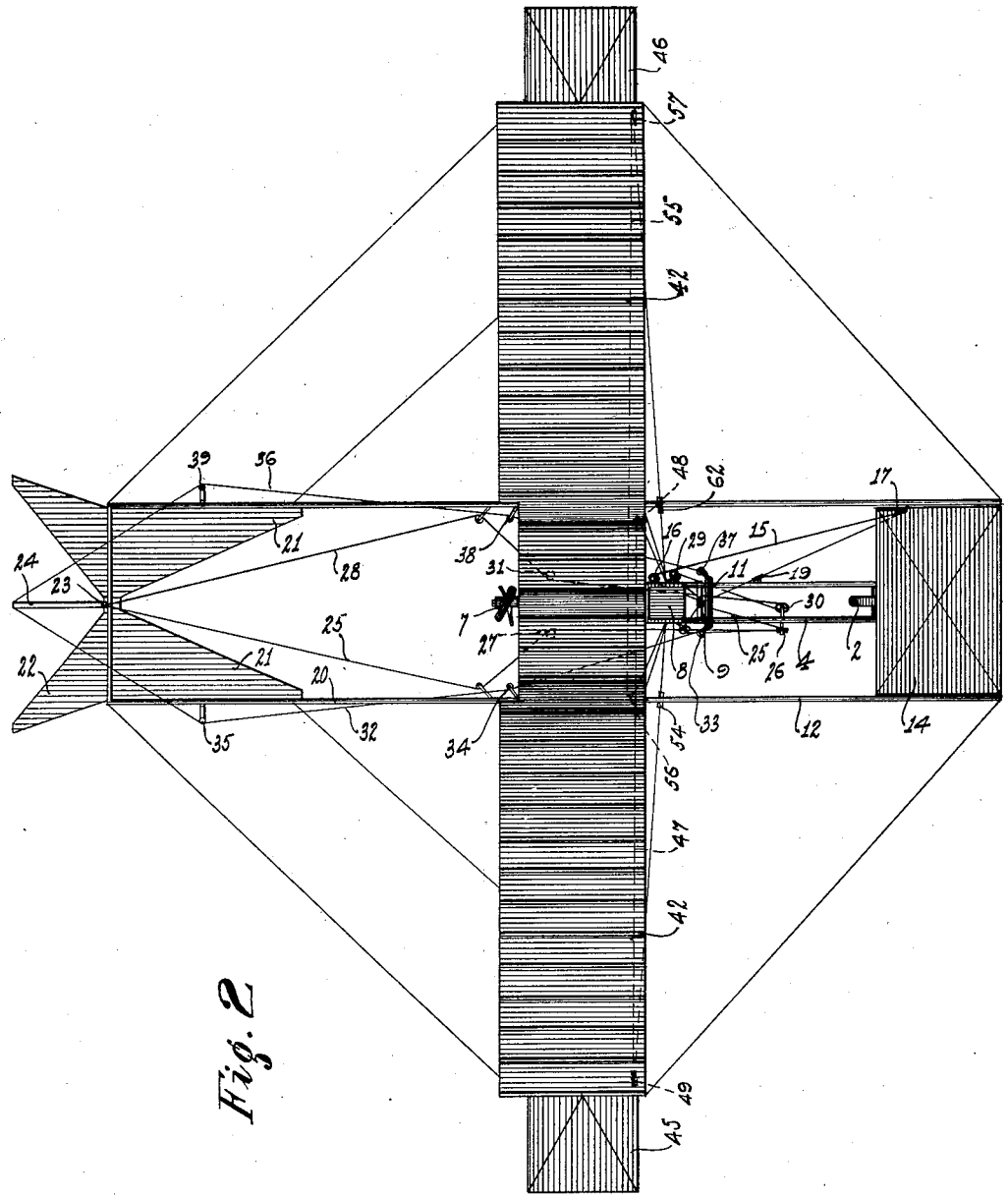

M. MELLARD.
AEROPLANE.
APPLICATION FILED NOV. 1, 1913.
1,097,038.
Patented May 19, 1914.
3 SHEETS—SHEET 1.
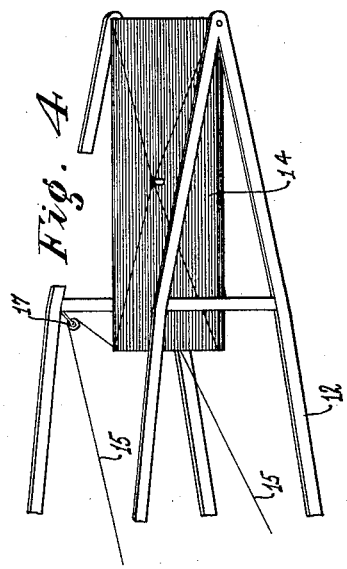
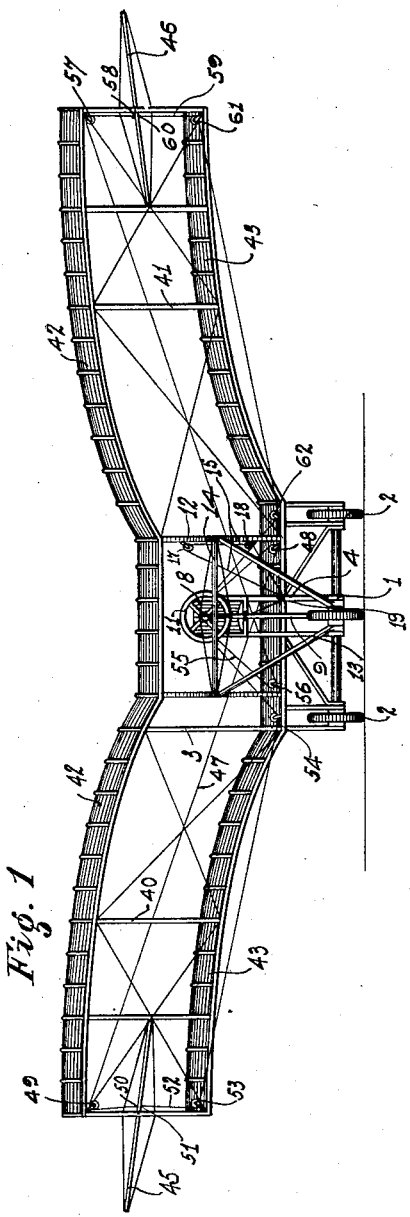
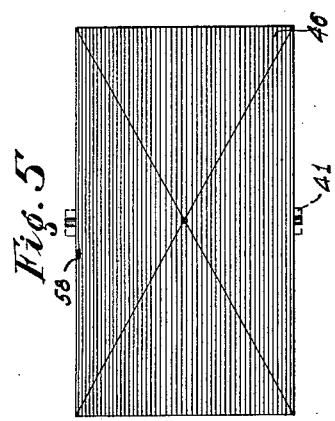
WITNESSES:
Clarence M. Smith
J. B. Webster
INVENTOR.
Matthew Mellard
BY
ATTORNEYS.

M. MELLARD.
AEROPLANE.
APPLICATION FILED NOV. 1, 1913.

1,097,038.

Patented May 19, 1914.

3 SHEETS—SHEET 2.

WITNESSES:
Clarence M. Smith
J. B. Webster

INVENTOR.
Matthew Mellard
BY
ATTORNEYS.

M. MELLARD.
AEROPLANE.
APPLICATION FILED NOV. 1, 1913.

1,097,038.

Patented May 19, 1914.

3 SHEETS—SHEET 3.

WITNESSES:
Clarence M. Smith
J. B. Webster

INVENTOR.
Matthew Mellard
BY
ATTORNEYS.

UNITED STATES PATENT OFFICE.

MATTHEW MELLARD, OF SACRAMENTO, CALIFORNIA.

AEROPLANE.

1,097,038.    Specification of Letters Patent.    Patented May 19, 1914.

Application filed November 1, 1913. Serial No. 798,704.

*To all whom it may concern:*

Be it known that I, MATTHEW MELLARD, a subject of Austria, residing at Sacramento, county of Sacramento, State of California, have invented certain new and useful Improvements in Aeroplanes; and I do declare the following to be a full, clear, and exact description of the same, such as will enable others skilled in the art to which it appertains to make and use the same, reference being had to the accompanying drawing, and to the characters of reference marked thereon, which form a part of this application.

This invention relates to improvements in air crafts and is particularly related to that type of air crafts known as aeroplanes, the object of the invention being to produce a safety aeroplane which will be practicable and effective in operation and of such design as will nearest resemble the structure of the body and wings of an eagle, the design being such that there will be more surface for the air to act upon and so constructed as to form air pockets to make it possible for the operator to descend to the ground without mishap should anything happen to stop the machinery.

A further object of the invention is to produce an aeroplane in which the air planes are curved in two ways in order to prevent the overturning of the machine while the same is flying in rough and windy weather, and one which will be under complete control at all times.

Another object of the invention is to produce a device so constructed as to permit the aeroplane to maintain its equilibrium at all times whether in stormy or calm weather. Also, the aim of my improved invention is to produce a new, novel and effective operating gear for operating the various planes and rudders of the device enabling quick and accurate action whenever desired.

A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 3:
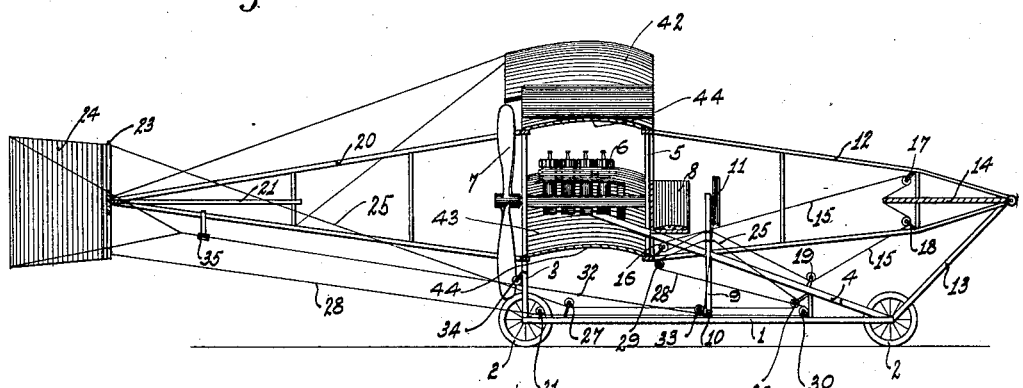
Figure 6:
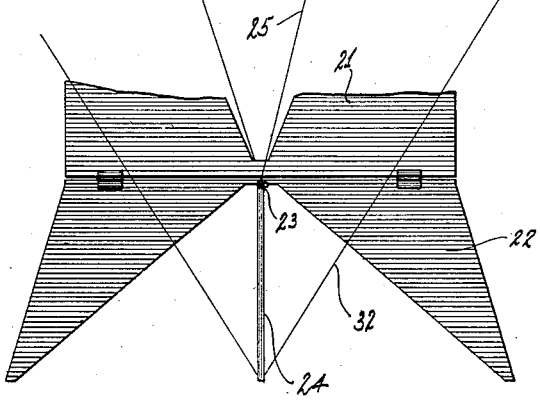
Figure 7:
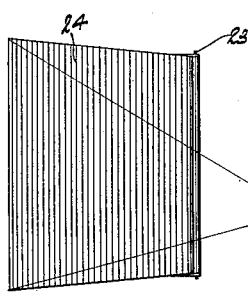

Figure 1 is a front elevation of the complete aeroplane. Fig. 2 is a top plan view of the same. Fig. 3 is a side elevation of the same. Fig. 4 is a fragmentary view of the front end of the forward outrigging showing the front elevating plane in position thereof. Fig. 5 is a top plan view of one of the side air planes. Fig. 6 is a top plan view of the rear elevating plane showing how it is hinged to the rear equilibrium maintaining plane. Fig. 7 is a side elevation of the rudder.

Referring now more particularly to the characters of reference on the drawings, the numeral 1 designates the main supporting frame of the device mounted upon wheels 2. Said frame 1 has vertical supporting posts 3 and obliquely disposed supporting beams 4, all of which maintain a central frame work 5 in which is disposed a motive power which consists of an explosive motor 6 connected to which is the propeller 7. This motor is of course equipped with the necessary control levers, ignition system, fuel supply, etc., all of the common type, hence no detail description of the same is here entered into.

Secured just in front of the frame work 5 is the operator's seat 8 which is so constructed as to be enabled to slide from side to side in any suitable manner. Secured to the upper frame of the member 1 are posts 9 pivotally mounted to said member 1 as at 10 and provided on their upper ends with a steering wheel 11.

The numeral 12 designates the front outrigging or frame connected with the frame work 5 and braced from the member 1 by braces 13. Pivotally mounted in the outer end of this forward outrigging is the front elevating plane 14. A cable 15 is connected with one of the members 9 and projects over a pulley 16 suitably secured on the member 4 to the rear of the members 9 and then projects over a pulley 17 secured to the outrigging 12 on one side of the plane 14 and is then secured to the free end of the plane 14, then projects over a pulley 18 secured to the rigging 12 on the other side of the plane 14 from whence said cable 15 projects over another pulley 19 secured to the member 4 and is thence connected again with one of the members 9. By means of this cable 1, it can readily be seen, that by the use of this cable the plane 14 may be moved on its pivotal point by moving the members 9 on their pivotal points 10.

The numeral 20 designates the rear outrigging or supporting frame secured to the frame 5 and carrying on its outer end a rigid equilibrium plane 21 to which is hinged the rear elevating plane 22. This elevating plane 22 is substantially the shape of a bird's tail, being thus designed to give the machine more buoyancy with the least amount of air friction, while the equilibrium plane 21 is made of a larger size to prevent the overturning of the aeroplane.

The plane 22 is split centrally as shown clearly in Figs. 2 and 6 and is provided with a central transversely disposed pin 23 rigidly connected therewith and on this pin 23 is pivotally mounted the rudder 24 of the aeroplane. A cable 25 is secured on the members 9 and projects over a pulley 26 secured to the member 4 at the front of said members 9, thence projects over a pulley 27 secured to the member 1 near the rear end thereof and thence projects to and is connected with the upper end of the pin 23. Another cable 28 is connected with the opposite side of the members 9 to that on which the cable 25 is secured and projects over a pulley 29 secured at the rear of said members 9 and thence projects over a pulley 30 secured at the front of said members 9 and thence projects over a pulley 31 secured near the rear of the frame 1 and is thence connected with the pin 23 at the lower end thereof. A cable 32 is mounted on the steering wheel 11 and projects on one side thereof over a pulley 33 secured on the frame 1 and thence over pulleys 34 and 35 projecting outwardly from the rear rigging 20 and is connected with the rear edge of the rudder 24 on one side thereof. On the other side of the steering wheel 11 is connected a similar cable 36 which projects over a pulley 37 on one side thereof and thence over pulleys 38 and 39 projecting outwardly from the rear rigging 20 and is connected with the rear edge of the rudder 24 on the opposite to that which is secured the cable 32.

The numeral 40 designates the right outrigging and the numeral 41 the left outrigging supported on the frame 5 and on which are formed the upper and lower air planes or wings 42 and 43 respectively. These wings or planes are formed substantially to conform to the contour of the wings of an eagle and are curved in cross section to form air pockets 44.

In the outer ends of the outriggings 40 and 41 respectively, are hinged the right and left air planes 45 and 46 respectively. Connected with the seat 8 on one side thereof is a cable 47 which projects over a pulley 48 on the same side and thence projects over a pulley 49 in the outrigging 40 and is then connected with the air plane 45 slightly off the center of this hinged connection as at 50. Connected with the said air plane 45 on the side opposite the side 50 as at 51 is another cable 53 which projects over a pulley 53 and is then projected over a pulley 54 and then connected with the seat 8 on the side opposite to that on which the cable 47 is connected. Hence, when the operator slides the seat 8 from one side to the other, it will shift the plane 45 one way or the other for the purpose of balancing the machine and at the same time the other plane 46 will be similarly moved by means of the following structure: A cable 55 is connected with the seat 8 on the side opposite to which the cable 47 is connected and this cable 55 then projects over a pulley 56 on the same side and then projects over a pulley 57 on the outrigging 41 and is connected with the upper side of the plane 56 as at 58. A cable 59 connects with the opposite side of the plane 46 as at 60 and then projects over a pulley 61, thence over a pulley 62 and connects with the seat 8 on the side opposite the connection of the cable 55 therewith. Hence, with the movement of the seat 8 the plane 46 is also moved simultaneously with the plane 45.

Describing now the operation of the device, the operator seats himself on the seat 8 and when he desires to rise into the air, the air cooled engine 6 is started in motion driving the propeller 7. The operator then grips the steering wheel 11 and pulls it toward himself moving the members 9 on the pivotal points 10, which action through the cable mechanism described lowers the rear end of the elevating plane 14 and 22 which places the machine in a position to ascend and raises the rear end of the plane then when the machine has ascended to a desired height, the members 9 are returned to vertical position which leaves the planes 14 and 22 in normal horizontal position. The operator then maintains his equilibrium by moving his seat 8 one way or the other to operate the planes 45 and 46 in the manner described, the steering of course being accomplished by means of the steering wheel 11 and the cable structure which connects with the rudder 24. When the operator desires to descend he moves the members 9 away from himself which tilts the rear end of the plane 14 upwardly and the rear end of the plane 22 downwardly thus causing the machine to descend.

While in the air the shape of the planes or wings 42 are such as to give the greatest amount of bearing surface and also form the air pockets which prevent the machine from overturning in case of the failure of the machinery. Further, the general construction of the planes is such as to give more surface for the air to act upon and this in connection with the fact that the center of gravity is very low on the machine which makes it positively safe against over-balancing and allows the operator at all times to descend to the earth in safety should anything happen to his machine.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

A device of the character described comprising a bottom supporting frame mounted on wheels, vertical supporting posts secured to the rear end of said bottom supporting frame, obliquely disposed supporting posts projecting from the front end of said bottom frame, a central frame mounted on said vertical and said oblique supporting posts, a motive means carried by said center frame, a seat supported in front of said center frame, a post hinged to said bottom frame and projecting to a point adjacent said seat, a front outrigging connected with said central frame, brace members projecting from the front end of said bottom frame and supporting the outer end of said front outrigging, a rear outrigging projecting from said center frame, an elevating plane pivotally mounted in the outer end of each of said front and rear outriggings, means for controlling said planes with said hinged post, a rudder in said rear outrigging, a steering wheel on said hinged post, means for controlling said rudder with said steering wheel, a pair of spaced projecting planes extending laterally on each side of said central frame and balancing planes disposed in the outer end of each pair of said last named planes, as described.

In testimony whereof I affix my signature in presence of two witnesses.

MATTHEW MELLARD.

Witnesses:
V. L. HATFIELD,
FRANK O. PRIOR.

---

Copies of this patent may be obtained for five cents each, by addressing the "Commissioner of Patents, Washington, D. C."